United States Patent
Ooba et al.

(10) Patent No.: US 11,097,768 B2
(45) Date of Patent: Aug. 24, 2021

(54) SUPPLEMENTAL TURNING FUNCTION-EQUIPPED HUB UNIT AND VEHICLE

(71) Applicant: NTN CORPORATION, Osaka (JP)

(72) Inventors: Hirokazu Ooba, Iwata (JP); Tomomi Ishikawa, Iwata (JP); Kentaro Nishikawa, Iwata (JP); Satoshi Utsunomiya, Iwata (JP); Yusuke Ohata, Iwata (JP); Taisuke Igi, Iwata (JP); Norio Ishihara, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/721,519

(22) Filed: Dec. 19, 2019

(65) Prior Publication Data

US 2020/0122771 A1    Apr. 23, 2020

Related U.S. Application Data

(63) Continuation of application No. PCT/JP2018/023592, filed on Jun. 21, 2018.

(30) Foreign Application Priority Data

Jun. 23, 2017  (JP) .............................. JP2017-122997

(51) Int. Cl.
  *B62D 5/04*   (2006.01)
  *B62D 7/18*   (2006.01)
  *F16C 19/18*  (2006.01)

(52) U.S. Cl.
  CPC ............. *B62D 5/0427* (2013.01); *B62D 7/18* (2013.01); *F16C 19/187* (2013.01); *F16C 2326/02* (2013.01)

(58) Field of Classification Search
  CPC ........ B62D 5/0427; B62D 7/18; F16C 19/187
  See application file for complete search history.

(56) References Cited

U.S. PATENT DOCUMENTS 5,027,275 A  *  6/1991  Sakamoto .............  G01M 17/06
                                                 280/86.758
5,538,356 A  *  7/1996  Aarre .......................  F16C 11/02
                                                    403/371

(Continued)

FOREIGN PATENT DOCUMENTS

CN          101730802 A       6/2010
DE     10 2009 006 903 A1     8/2010

(Continued)

OTHER PUBLICATIONS

International Search report dated Aug. 28, 2018 in corresponding International Patent Application No. PCT/JP2018/023592.

(Continued)

*Primary Examiner* — Tony H Winner
*Assistant Examiner* — Conan D Duda

(57) ABSTRACT

A supplemental turning function-equipped hub unit includes: a hub unit body including a hub bearing; and a unit support member configured to be mounted through a suspension device, the unit support member supporting the hub unit body through rotation-permitting support components at two upper and lower portions of the hub unit body such that the hub unit body is rotatable about a supplemental turning axis. A supplemental turning force receiving part is provided on a side part of the hub unit body, which part is configured to receive a force that causes the hub unit body to rotate about the supplemental turning axis.

8 Claims, 15 Drawing Sheets

TRAVELLING DIRECTION

(56) References Cited

U.S. PATENT DOCUMENTS

| | | | |
|---|---|---|---|
| 6,339,956 B1* | 1/2002 | Huinink | B60C 15/06 |
| | | | 152/152.1 |
| 8,162,332 B2 | 4/2012 | Michel et al. | |
| 8,998,501 B2 | 4/2015 | Dahlman et al. | |
| 2002/0036385 A1 | 3/2002 | Mackle et al. | |
| 2009/0008887 A1* | 1/2009 | Buma | B60G 21/0555 |
| | | | 280/5.511 |
| 2010/0164189 A1* | 7/2010 | Buma | B60G 17/0161 |
| | | | 280/5.521 |
| 2010/0215296 A1* | 8/2010 | Dahlman | F16C 33/36 |
| | | | 384/51 |
| 2010/0253026 A1 | 10/2010 | Michel et al. | |
| 2010/0320706 A1* | 12/2010 | Horiguchi | B62D 17/00 |
| | | | 280/5.521 |
| 2010/0332083 A1* | 12/2010 | Yanagi | B62D 7/159 |
| | | | 701/42 |
| 2013/0153338 A1* | 6/2013 | Yamauchi | F01M 1/16 |
| | | | 184/26 |
| 2013/0160604 A1* | 6/2013 | McNeil | F16C 11/0614 |
| | | | 74/594 |
| 2017/0137059 A1* | 5/2017 | Ohba | B60G 3/26 |
| 2019/0161115 A1* | 5/2019 | Yamazaki | B62D 7/20 |
| 2020/0079167 A1* | 3/2020 | Brenner | B60G 7/008 |
| 2020/0239064 A1* | 7/2020 | Hallundbæk | B60G 3/20 |
| 2020/0276896 A1* | 9/2020 | Kawamura | B60K 6/26 |
| 2020/0282769 A1* | 9/2020 | Utsunomiya | B62D 5/04 |
| 2021/0001921 A1* | 1/2021 | Ishihara | B62D 6/003 |

FOREIGN PATENT DOCUMENTS

| | | |
|---|---|---|
| DE | 10 2009 033 105 | 1/2011 |
| DE | 10 2012 206 337 | 10/2013 |
| DE | 10 2014 205 145 A1 | 9/2015 |
| EP | 2 060 416 A1 | 5/2009 |
| JP | 2009-226972 | 10/2009 |
| JP | 2014-61744 | 4/2014 |
| JP | 2016-147513 | 8/2016 |
| WO | 2008/147284 A1 | 12/2008 |
| WO | WO-2018210587 A1 * | 11/2018 ............ B62D 7/06 |

OTHER PUBLICATIONS

English Translation by WIPO of the International Preliminary Report on Patentability dated Jan. 2, 2020 in corresponding International Patent Application No. PCT/JP2018/023592.

Japanese Office Action dated Mar. 16, 2021, in Japanese Patent Application No. 2017-122997 (6 pages including translation).

Extended European Search Report dated Feb. 2, 2021, in European Patent Application No. 18820501.7 (8 pages, in English).

Chinese Office Action for Chinese Patent Application No. 201880041374.4 dated Jul. 5, 2021 (13 pages including translation).

* cited by examiner

SUPPLEMENTAL TURNING FUNCTION-EQUIPPED HUB UNIT AND VEHICLE

CROSS REFERENCE TO THE RELATED APPLICATION

This application is a continuation application, under 35 U.S.C. § 111(a) of international patent application No. PCT/JP2018/023592, filed Jun. 21, 2018, which claims priority to Japanese patent application No. 2017-122997, filed Jun. 23, 2017, the entire disclosures of all of which are herein incorporated by reference as a part of this application.

BACKGROUND OF THE INVENTION

Field of the Invention

The present invention relates to a supplemental turning function-equipped hub unit having a function of performing additional turning to turning performed by a steering device and/or performing supplemental turning, such as rear wheel turning, and to a vehicle having such a supplemental turning function-equipped hub unit.

Description of Related Art

In general, vehicles, such as automobiles, include a steering wheel mechanically connected with a steering device, the steering device having opposite ends connected to left and right wheels through tie rods. Therefore, a turning angle of the left and right wheels according to operation of the steering wheel is determined by an initial setting.

Known vehicle geometries include: (1) "parallel geometry" in which left and right wheels have the same turning angle; and (2) "Ackermann geometry" in which a turning angle of an inner-ring tire is made larger than a turning angle of an outer-ring tire so as to have a single center of turning.

The vehicle geometries influence stability of travelling. For example, Patent Documents 1 and 2 listed below disclose mechanisms that allow the steering geometries to be changed in accordance with travelling conditions. In Patent Document 1, a knuckle arm and a joint position are relatively changed with each other, thereby to change the steering geometries. In Patent Document 2, two motors are used to allow both of a toe angle and a camber angle to be changed to any angle. In addition, Patent Document 3 discloses a mechanism for a four-wheel independent turning.

As a rear wheel steering device, a device that causes left and right rear wheels to turn in conjunction with each other so as to assist turning performed by the front wheels has been known (for example, Patent Document 4).

RELATED DOCUMENT

Patent Document

[Patent Document 1] JP Laid-open Patent Publication No. 2009-226972

[Patent Document 2] DE Patent Publication No. 102012206337

[Patent Document 3] JP Laid-open Patent Publication No. 2014-061744

[Patent Document 4] JP Laid-open Patent Publication No. 2016-147513

In Ackermann geometry, a difference in turning angles of left and right wheels is set such that the respective wheels turn about a single common pint in order to smoothly turn the wheels in turning in a low-speed range where a centrifugal force acting on a vehicle is negligible. In contrast, in turning in a high-speed range where such a centrifugal force is not negligible, since it is desirable that the wheels generate a cornering force in a direction counterbalancing the centrifugal force, parallel geometry is preferred to Ackermann geometry.

As mentioned above, since a turning device of a general vehicle is mechanically connected to wheels, the vehicle can only assume a single fixed steering geometry and is often arranged or set in an intermediate geometry between Ackermann geometry and parallel geometry. In such a case, however, the turning angle of the outer ring becomes excessively large in a low-speed range because the difference in turning angles of the left and right wheels is insufficient, whereas the turning angle of the inner ring becomes excessively large in a high-speed range. Thus, when distribution of a tire lateral force becomes unnecessarily unbalanced between inner and outer rings, travel resistance may be deteriorated, thereby causing worsening of fuel economy and early wear of the tire. Further, there is a problem that smooth cornering is deteriorated because the inner and outer rings cannot not be effectively used.

Although the mechanisms disclosed in Patent Documents 1 and 2 can change the steering geometries, they have the following problems.

In Patent Document 1, a knuckle arm and a joint position are relatively changed, thereby to change the steering geometries, as mentioned above. Change made at this location would only cause small change in the tire angles, and it is thus necessary to cause a large change, i.e., to largely move them, in order to obtain a large effect. It is extremely difficult to provide a motor actuator which can provide such a large force that the vehicle geometries can be changed in such a part, due to space constraints.

Since two motors are used in Patent Document 2, the increased number of the motors results in increased costs and makes it complicated to control.

The mechanism disclosed in Patent Document 3 can only be applied to four-wheel independent steering vehicles. In addition, since a hub bearing is supported in a cantilever manner with respect to a turning shaft, rigidity is reduced, and a steering geometry may be changed due to generation of excessive turning acceleration G Where a speed reduction gear is provided on the turning shaft, a large power is required. However, where a larger motor is used to obtain such a large motor, it is difficult to dispose the entire motor in an inner peripheral part of a wheel. Where a speed reduction gear having a high reduction ratio is provided, responsibility is deteriorated.

As discussed above, a mechanism having a conventional supplemental turning function is intended to arbitrarily change a toe angle and a camber angle of a tire in a vehicle and thus has a complicated structure. In addition, it is difficult to ensure rigidity, and it is necessary to make the mechanism large in order to ensure rigidity, resulting in an increased weight.

On the other hand, a rear wheel steering device has been known in which left and right rear wheels are caused to turn in conjunction with each other, as discussed above. However, such a device tends to be unable to perform independent turning of the left and right rear wheels and/or toe angle adjustment. In addition, where the device is capable of performing independent turning, the device may have a complicated configuration and/or may not be sufficiently strong.

SUMMARY OF THE INVENTION

An object of the present invention is to provide a supplemental turning function-equipped hub unit that is capable of independently performing supplemental turning in left and right wheels in accordance with travel conditions, thereby improving motion performance of a vehicle to improve travel stability and fuel economy and has a simple and strong configuration, and to provide a vehicle including such a supplemental turning function-equipped hub unit.

A supplemental turning function-equipped hub unit of the present invention includes: a hub unit body including a hub bearing configured to support a wheel; a unit support member configured to be mounted to a vehicle body through a suspension device, the unit support member supporting the hub unit body through rotation-permitting support components at two portions of upper and lower portions of the hub unit body such that the hub unit body is rotatable about a supplemental turning axis extending in a vertical direction or an up-and-down direction; and a supplemental turning force receiving part provided in a side part of the hub unit body, the supplemental turning force receiving part being configured to receive a force that causes the hub unit body to rotate about the supplemental turning axis.

This configuration makes it possible to freely rotate the hub bearing that supports the wheel along with the hub unit body about the supplemental turning axis by the force applied from the supplemental turning force receiving part. This makes it possible to perform independent turning of a single wheel. Also, it is possible to arbitrarily change a toe angle of a tire in accordance with travel conditions of a vehicle. For these reasons, the supplemental turning function-equipped hub unit can be applied to either of a turning wheel (for example, a front wheel) and a non-turning wheel (for example, a rear wheel). Where the supplemental turning function-equipped hub unit is applied to a turning wheel, the hub unit can be provided to a member whose direction is changed by a steering device, thereby to cause a minute change in tire angles to left and right wheels in an individual manner or a linked manner, in addition to turning performed by steering operation by a driver.

The tire angles of the left and right wheels can be independently and arbitrarily changed during travelling in accordance with travel conditions of the vehicle. This makes it possible to change steering geometries during travelling, for example, to assume parallel geometry when turning in a high-speed range and to assume Ackermann geometry when turning in a low-speed range. Therefore, motion performance of the vehicle can be improved, making it possible to drive stably. Additionally, a suitable tire angle can be set so as to improve fuel economy. Where the supplemental turning function-equipped hub unit is applied to a rear wheel (non-turning wheel), a minimum turning radius when travelling at low speed can be reduced.

The supplemental turning function-equipped hub unit is supported by the rotation-permitting support components at two portions of upper and lower portions thereof so as to be rotatable about the supplemental turning axis. Thus, this arrangement of the hub unit being supported at both ends thereof ensures rigidity and achieves simple configuration. The supplemental turning function-equipped hub unit may be provided with, for example, a motor-driven actuator to apply a rotation force to the supplemental turning force receiving part. Thus, it is possible to independently perform supplemental turning in the left and right wheels in accordance with travel conditions and to arbitrarily change toe angles of the wheels, with simple configuration, while ensuring rigidity. Therefore, motion performance of the vehicle can be improved, making it possible to improve travel stability and fuel economy.

The supplemental turning function-equipped hub unit of the present invention may include a supplemental turning actuator configured to apply a driving force, that causes the hub unit body to rotate about the supplemental turning axis, to the supplemental turning force receiving part. Where the supplemental turning actuator is provided, tire angles, such as toe angles, can be freely controlled in accordance with travel conditions.

The supplemental turning axis may extend in the vertical direction. As long as the supplemental turning axis extends in a vertical direction or an up-and-down direction, it may be tilted to some extent. Where the axis extends in the vertical direction, it is possible to better suppress a change in a camber angle due to supplemental turning and to further suppress an increase in travel resistance. Further, where the axis extends in the vertical direction, it is easier to ensure a region for installing the unit support member in a limited space of a tire house.

In the supplemental turning function-equipped hub unit of the present invention, the rotation-permitting support component may be a spherical sliding bearing. The term "spherical sliding bearing" used herein refers to bearings, including a spherical bush and a pivot bearing. Such a sliding bearing can accommodate inclination of a central axis of the rotation-permitting support component, even if the central axis is tilted with respect to the supplemental turning axis, because the spherical sliding bearing can rotate in any direction about a spherical center thereof. Therefore, it is possible to fix the hub unit in a different direction from that of the supplemental turning axis, which improves flexibility in mounting positions and makes it easier to process. Further, use of a spherical sliding bearing makes it possible to apply preload between a stationary-side component and a mobile-side component of the bearing through clamping when mounting the bearing, thereby to increase rigidity.

In the supplemental turning function-equipped hub unit of the present invention, the rotation-permitting support component may be a tapered roller bearing, or an angular ball bearing, or a four-point-contact ball bearing. Since a tapered roller bearing, an angular ball bearing or a four-point-contact ball bearing can bear axial load, it is possible to apply preload to the bearing through clamping when mounting the bearing. Thus, the bearing can be supported without rattling due to inner gaps of the bearing, resulting in enhanced rigidity. Although a deep grooved ball bearing can also bear axial load to some extent, the above-mentioned bearings can bear larger axial load.

A vehicle of the present invention includes one or both of front wheels and rear wheels that are supported by supplemental turning function-equipped hub units of the present invention. Therefore, the above effect of the supplemental turning function-equipped hub unit of the present invention can be obtained. Where supplemental turning function-equipped hub units of the present invention are applied to turning wheels (for example, front wheels), toe angle adjustment during travelling can be effectively performed. Where they are applied to non-turning wheels (for example, rear wheels), a minimum turning radius when travelling at low speed can be reduced, thanks to slight turning of the non-turning wheels.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF THE EMBODIMENTS

Figure 1:
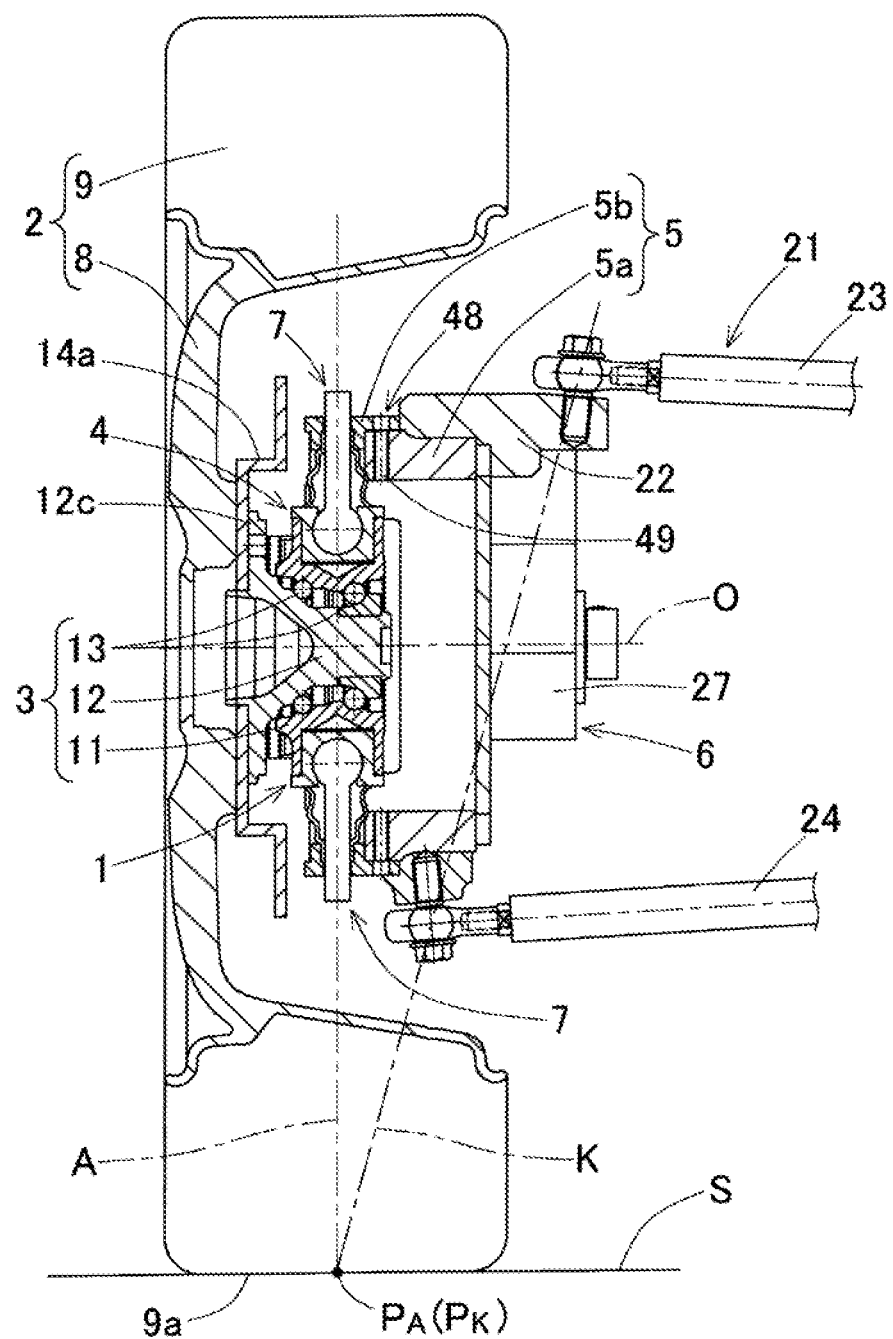
FIG. 1 is a longitudinal section view of a supplemental turning function-equipped hub unit according to a first embodiment of the present invention and surrounding features.

A first embodiment of the present invention will be described with reference to the drawings. As shown in FIG. 1, a supplemental turning function-equipped hub unit 1 includes: a hub unit body 4 including a hub bearing 3 for supporting a wheel 2; a unit support member 5; and a supplemental turning actuator 6. The hub unit body 4 is supported by the unit support member 5 through rotation-permitting support components 7, 7 at two portions or upper and lower portions thereof so as to be rotatable about a supplemental turning axis A extending in a vertical direction or an up-and-down direction. The supplemental turning axis A is different from a rotation axis O of the wheel 2 and from a king pin axis K of main steering. The wheel 2 includes a wheel body 8 and a tire 9.

Figure 15:
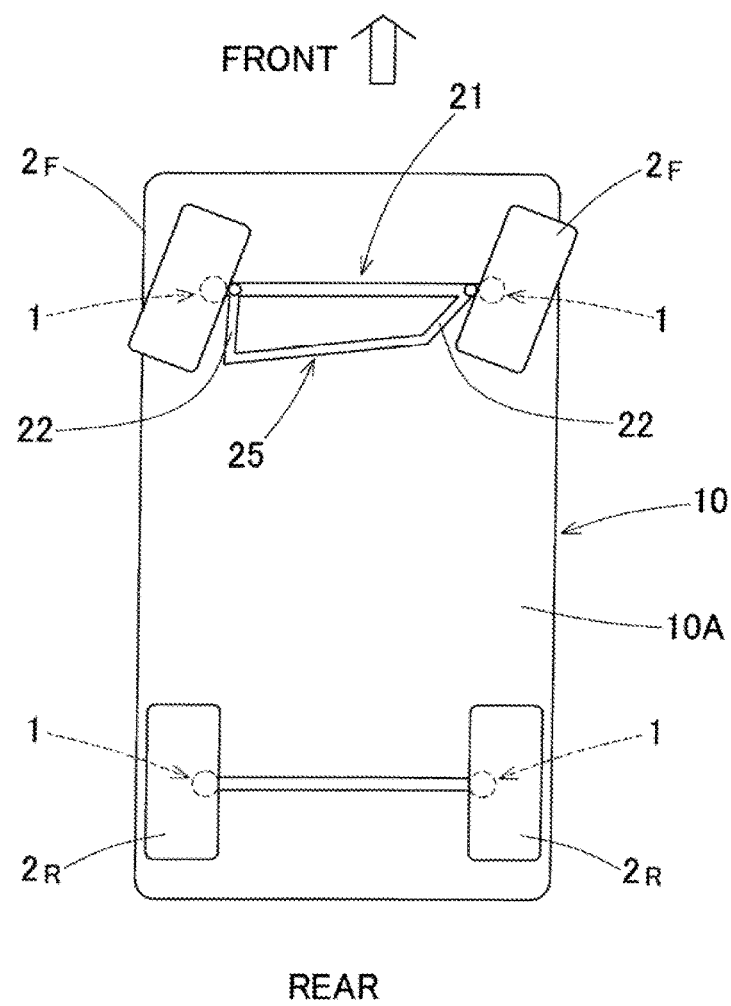
FIG. 15 is a schematic plan view illustrating an example of a vehicle to which a supplemental turning function-equipped hub unit according to the first and second embodiments is applied.

The supplemental turning function-equipped hub unit 1 of this embodiment is mounted to a knuckle 22 of a front wheel that is a turning wheel. Specifically, as shown in FIG. 15, the supplemental turning function-equipped hub unit 1 is operable to perform individual turning of each of the left and right wheels 2 by a minute angle, in addition to turning performed by a steering device 25 of front wheels 2F of a vehicle 10. The steering device 25 causes wheels 2F, 2F to turn in accordance with operation of a steering wheel (not illustrated). It should be noted that the supplemental turning function-equipped hub unit 1 may be used for performing turning of each of the rear wheels 2R to assist front wheel turning.

In FIG. 1, the unit support member 5 is mounted to a knuckle 22 of a suspension device 21 disposed in a vehicle body 10A (FIG. 15). The unit support member 5 may be provided integrally with the knuckle 22, i.e., as a part of the knuckle 22. The suspension device 21 of this embodiment is of a double wishbone type and includes an upper arm 23 and a lower arm 24 connected with each other through a shock absorber (not illustrated). The knuckle 22 is provided so as to be turnable about a king pin axis K that is tilted between tip ends of the upper arm 23 and the lower arm 24. The suspension device 21 is not limited to this configuration and may be of any known type, such as an independent suspension type.

Figure 2:
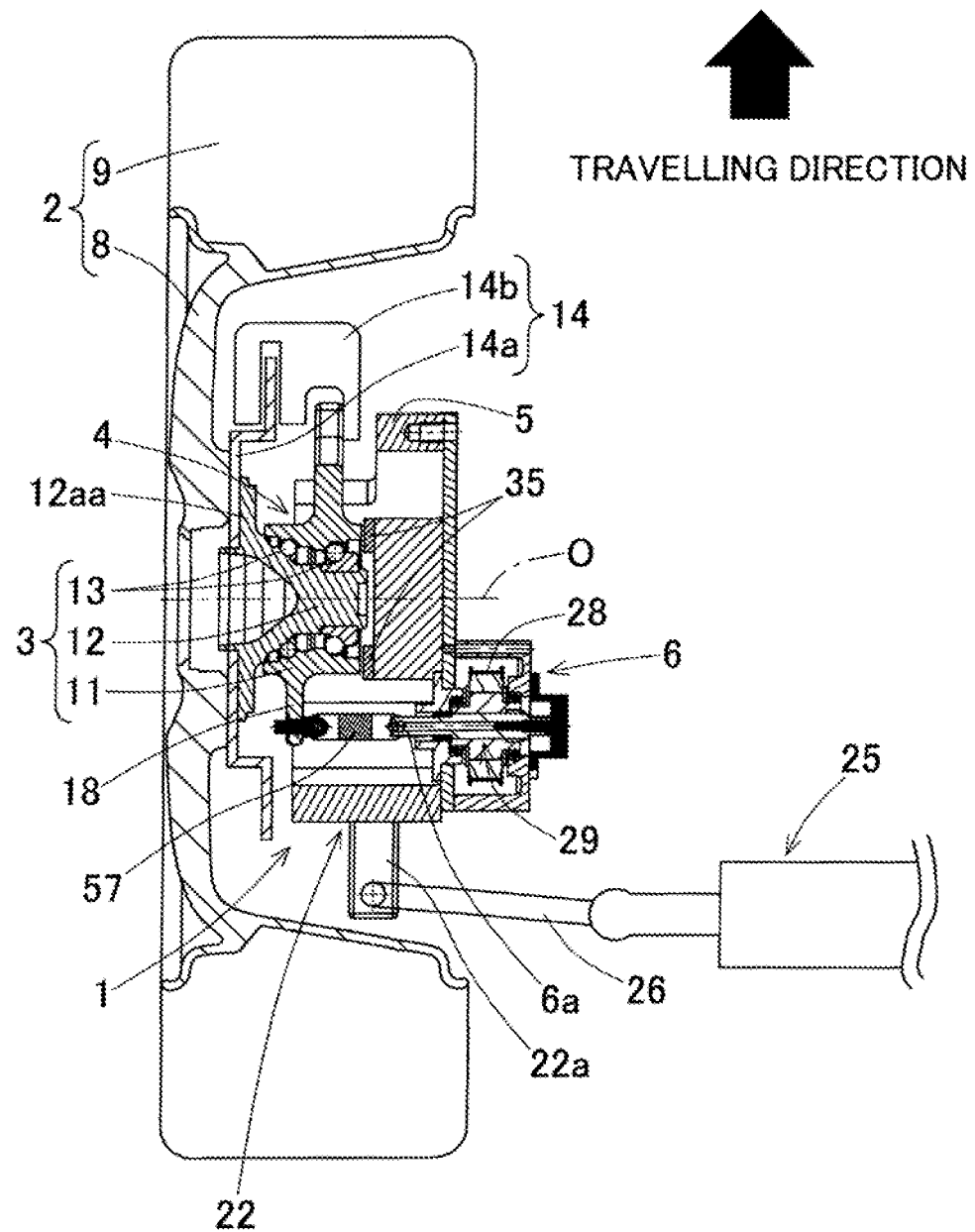
FIG. 2 is a horizontal section view of the supplemental turning function-equipped hub unit and the surrounding features.

As shown in FIG. 2, the knuckle 22 includes a steering device coupling part 22a protruding radially outward of the wheel 2. The steering device coupling part 22a is rotatably coupled with a tie rod 26 of the steering device 25.

Figure 3:
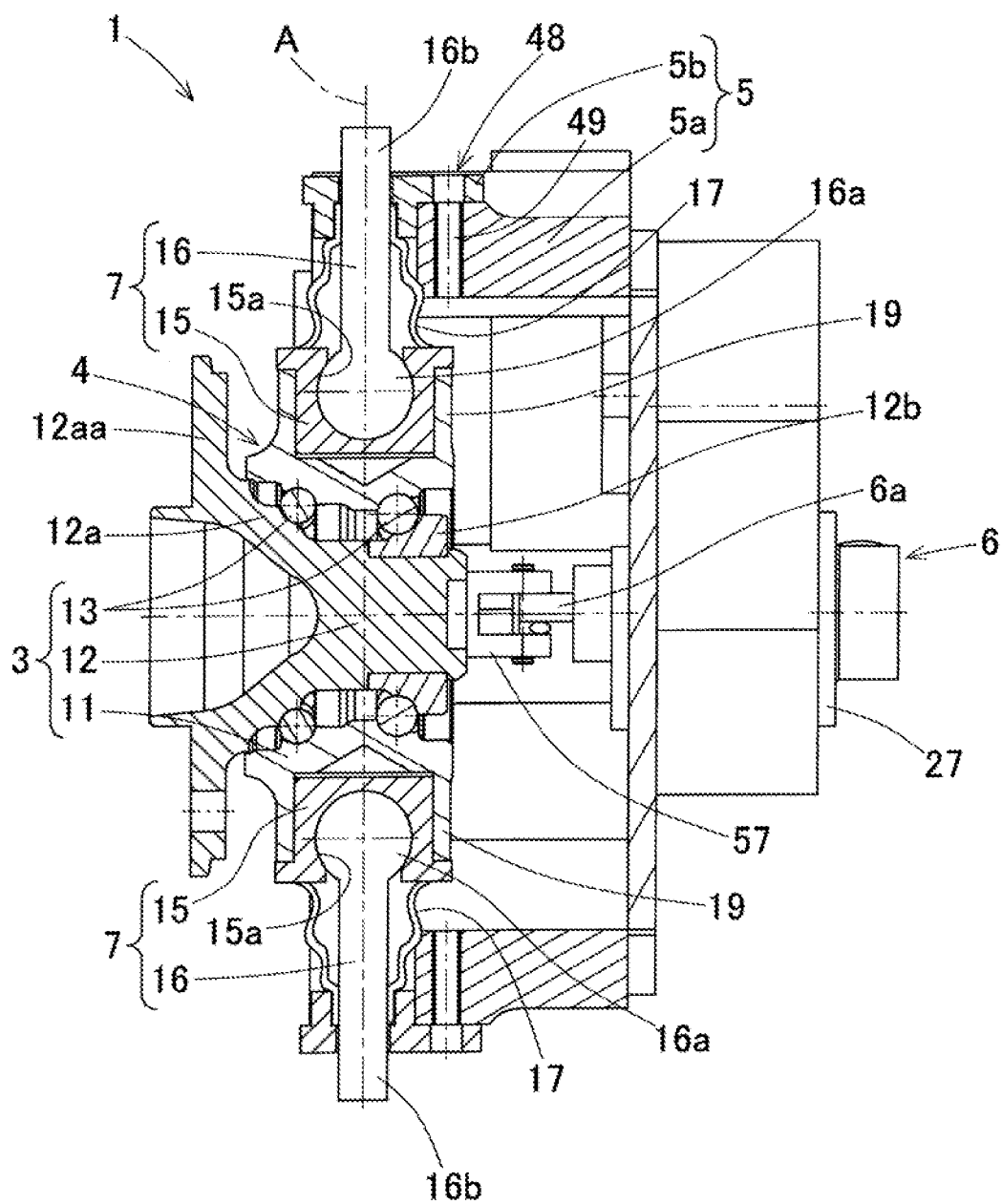
FIG. 3 is a longitudinal section view of the supplemental turning function-equipped hub unit.

As shown in FIG. 3, the hub bearing 3 includes: an inner ring 12; an outer ring 11; and rolling elements 13 interposed between the inner and outer rings 12, 11. The rolling elements 13 are, for example, balls. The hub bearing 3 couples a vehicle-body-side member and the wheel 2. The hub bearing 3 of this embodiment is an angular ball bearing in which: the outer ring 11 is a fixed ring; the inner ring 12 is a rotary ring; and the rolling elements 13 are arranged in double rows.

The inner ring 12 is constituted from two parts, i.e., a hub ring part 12a and an inner ring part 12b. The hub ring part 12a includes a hub flange 12aa and forms a raceway surface on an outboard side. The inner ring part 12b forms a raceway surface on an inboard side. The wheel body 8 of the wheel 2 as shown in FIG. 2 is fixed to the hub flange 12aa along with a brake rotor 14a by use of a bolt. The inner ring 12 rotates about the rotation axis O.

Figure 4:
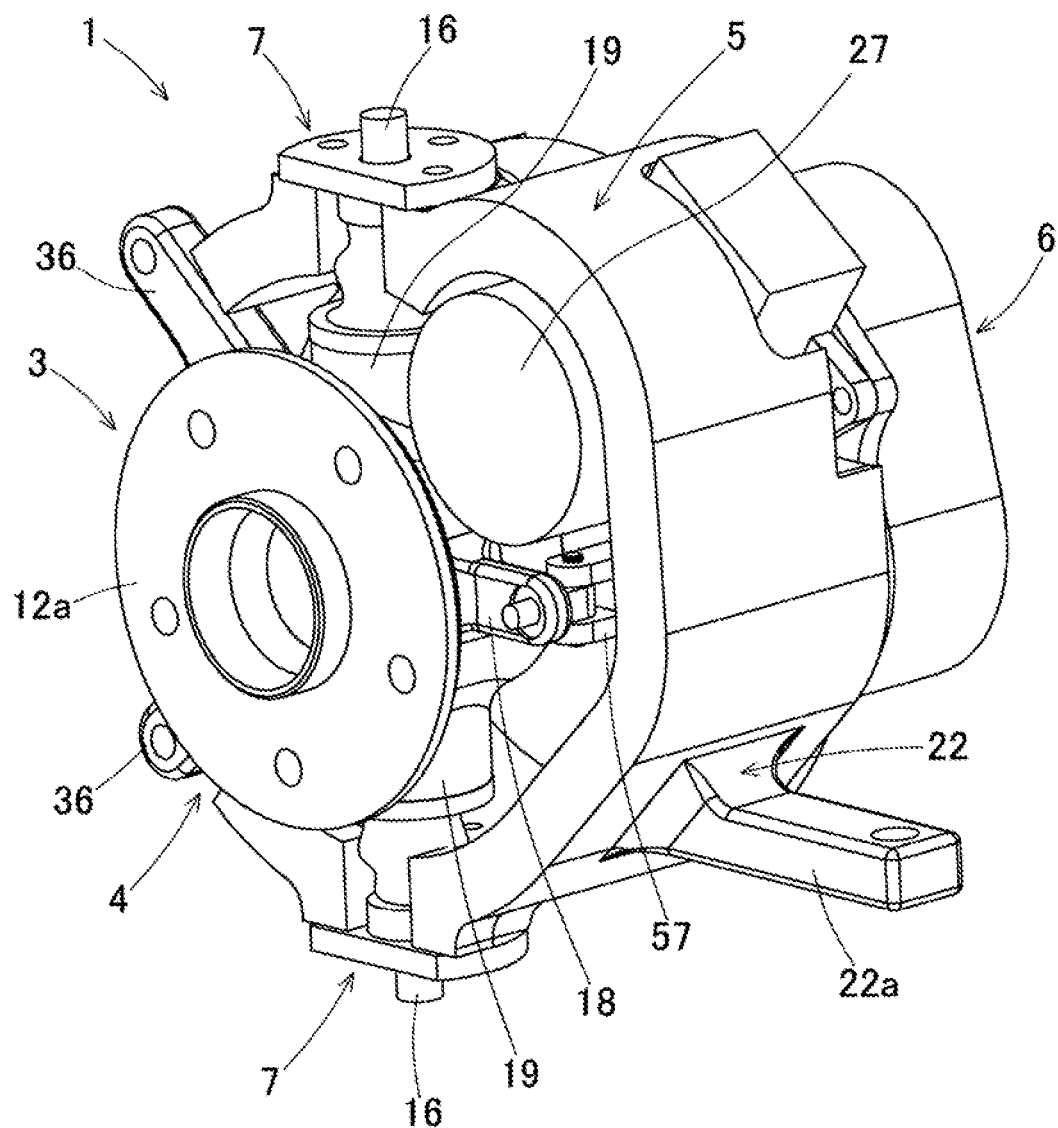
FIG. 4 is a perspective view illustrating an external appearance of the supplemental turning function-equipped hub unit.
Figure 5:
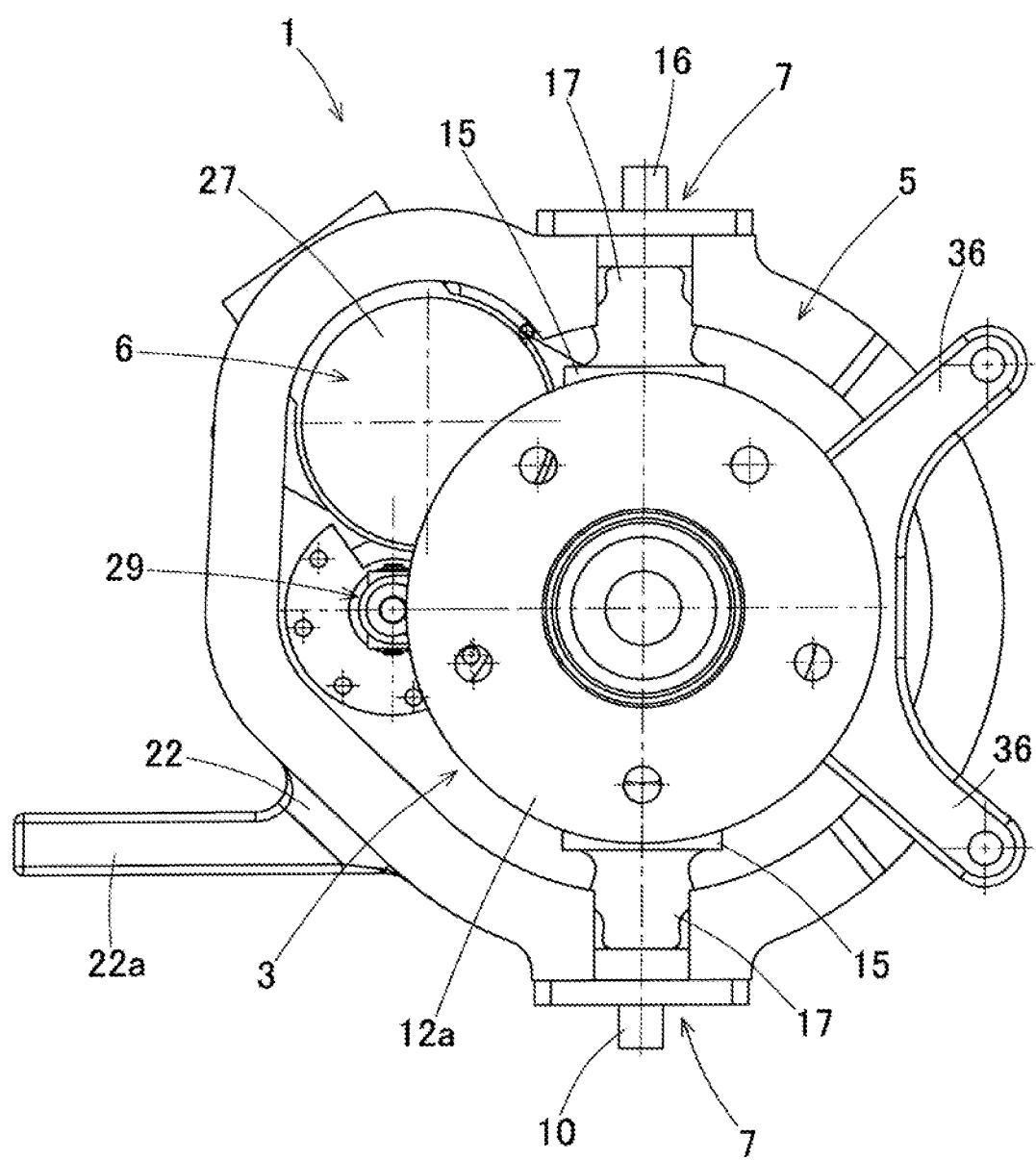
FIG. 5 is a left-side view of the supplemental turning function-equipped hub unit.

The brake rotor 14a and a brake caliper 14b cooperate together to constitute a brake 14 along with. The brake caliper 14b is attached to brake caliper attachment parts 36 that are formed integrally with the outer ring 11 (see FIG. 3) in upper and lower portions of the outer ring so as to protrude in an arm-like manner, as shown in FIG. 4, FIG. 5.

In FIG. 3, the hub unit body 4 is a part of the supplemental turning function-equipped hub unit 1, which part rotates about the supplemental turning axis A. The hub unit body 4 includes: the hub bearing 3; a rotary-side component 15 of the rotation-permitting support component 7; and a supplemental turning force receiving part 18 (see FIG. 2, FIG. 4).

The rotation-permitting support component 7 in this embodiment includes a spherical sliding bearing and the rotary-side component 15 having a recessed spherical seat 15a and a stationary-side component 16. The term "spherical sliding bearing" used herein refers to bearings, including a spherical bush and a pivot bearing. The stationary-side component 16 includes a spherical part 16a fitted to the recessed spherical seat 15a so as to be rotatable in any direction and a shaft part 16b having a tip end formed with the spherical part 16a. The recessed spherical seat 15a is covered by a flexible bellow boot 17 covering an outer periphery of the shaft part 16b.

Attachment seats 19 having a cylindrical shape are provided on an outer peripheral surface of the outer ring 11 of the hub bearing 3. The attachment seats 19 protrude radially outward from the outer peripheral surface of the outer ring 11. The attachment seats 19 are provided at upper and lower portions of the outer peripheral surface of outer ring 11. The rotary-side component 15 of each of the upper and lower rotation-permitting support component 7 is attached to each of the upper and lower attachment seats 19, 19 in a fitted manner.

The stationary-side component 16 of the rotation-permitting support component 7 is attached to the unit support member 5 such that preload applied to the rotation-permitting support component 7 can be adjusted by a preload adjusting unit 48. The unit support member 5 includes a support member body 5a fixed to the knuckle 22 and separated support pieces 5b that are position-adjustable with respect to the support member body 5a in a direction along the supplemental turning axis A. The support pieces 5b are position-adjustable with respect to the support member body 5a by fastening of an adjustment bolt 49. The support member body 5a, the support pieces 5b and the adjustment bolt 49 cooperate together to constitute the preload adjusting unit 48.

In this embodiment, the outer ring 11 of the hub bearing 3 is integrally formed with the attachment seats 19, and the rotary-side component 15 of the rotation-permitting support component 7 is directly attached to the outer ring 11, as described above. However, a mounting part (not illustrated), such as an axle box, may be provided on the outer periphery of the outer ring 11 so that the rotary-side component 15 of the rotation-permitting support component 7 is attached to the mounting part.

As shown in FIG. 1, in this embodiment, a direction of the supplemental turning axis A of the hub unit body 4 differs from a direction of the king pin axis K, and corresponds to the vertical direction. In this embodiment, the supplemental turning axis A is defined such that both of "an intersection position PK of an extension line of the king pin axis K and a road surface S" and "an intersection position PA of an extension line of the supplemental turning axis A and the road surface S" are located on a tire grounding surface 9a. Further, where the intersection positions PK, PA coincide with each other, slipping of the tire is minimized. Thus, it is preferable that the intersection positions PK, PA coincide with each other. The term "tire grounding surface" used herein refers to an area where the tire 9 is in contact with the road surface S in a state where a passenger (approximately 55 kg) is seated on the driver's seat.

The supplemental turning force receiving part 18 as shown in FIG. 2, FIG. 4 is a part that acts as a point of application where a supplemental turning force is applied to the outer ring 11 of the hub bearing 3. The supplemental turning force receiving part 18 is provided as an arm part that is integrally formed with a part of the outer periphery of the outer ring 11 of the hub bearing 3 so as to protrude. The supplemental turning force receiving part 18 is rotatably coupled with a linear output part 6a of the supplemental turning actuator 6 through a joint 57, as discussed later with reference to FIG. 13. Thus, when the linear output part 6a of the supplemental turning actuator 6 advances or retracts, the hub unit body 4 rotates about the supplemental turning axis A. That is, the hub unit body 4 is caused to perform supplemental turning.

The supplemental turning actuator 6 includes: a motor 27 (FIG. 3); a speed reduction gear 28 (as shown in FIG. 2) which reduces a speed of rotation of the motor 27; and a linear mechanism 29 which converts normal and reverse rotation outputs of the speed reduction gear 28 into reciprocating linear motion of the linear output part 6a. The motor 27 is, for example, a permanent magnet synchronous motor. The motor 27, however, is not limited to this and may be a direct current motor or an induction motor.

The speed reduction gear 28 may be a winding-type transmission mechanism, such as a belt transmission mechanism, or a gear train. In FIG. 2, a belt transmission mechanism is used as the speed reduction gear 28. The linear mechanism 29 may be a feed screw mechanism, such as a sliding screw and a ball screw, or a rack and pinion mechanism. In this embodiment, a feed screw mechanism with a trapezoid sliding screw is used as the linear mechanism 29.

Although the supplemental turning actuator 6 includes the speed reduction gear 28 in this embodiment, the supplemental turning actuator 6 may have no speed reduction gear 28 and be configured such that a driving force of the motor 27 is directly transmitted to the linear mechanism 29. Alternatively, the supplemental turning actuator 6 may have no motor 27. In such a case, the supplemental turning actuator 6 may be, for example, an actuator that is driven by hydraulic pressure.

Figure 6:
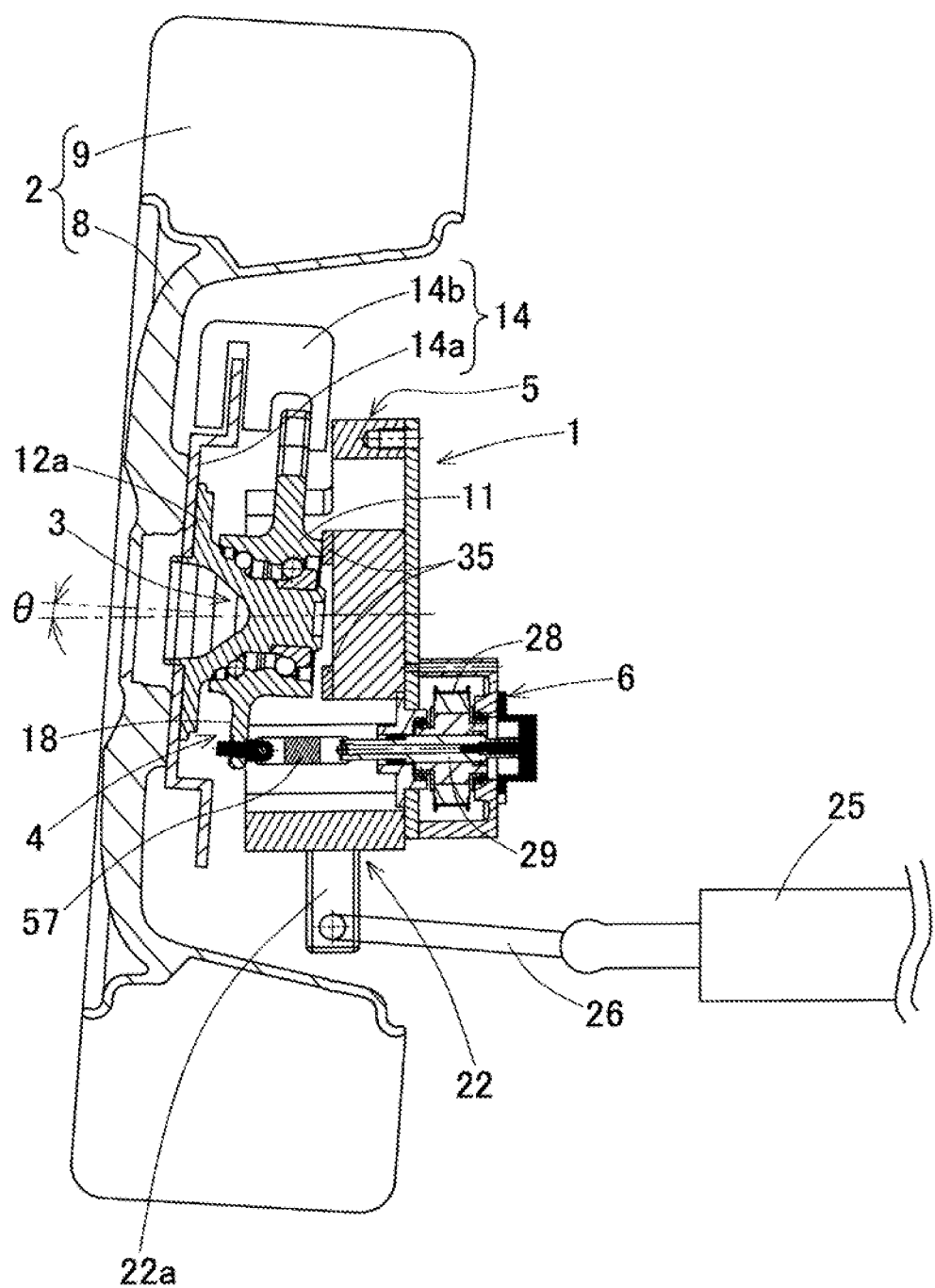
FIG. 6 is a horizontal section view of the supplemental turning function-equipped hub unit in a main-turning neutral state.
Figure 7:
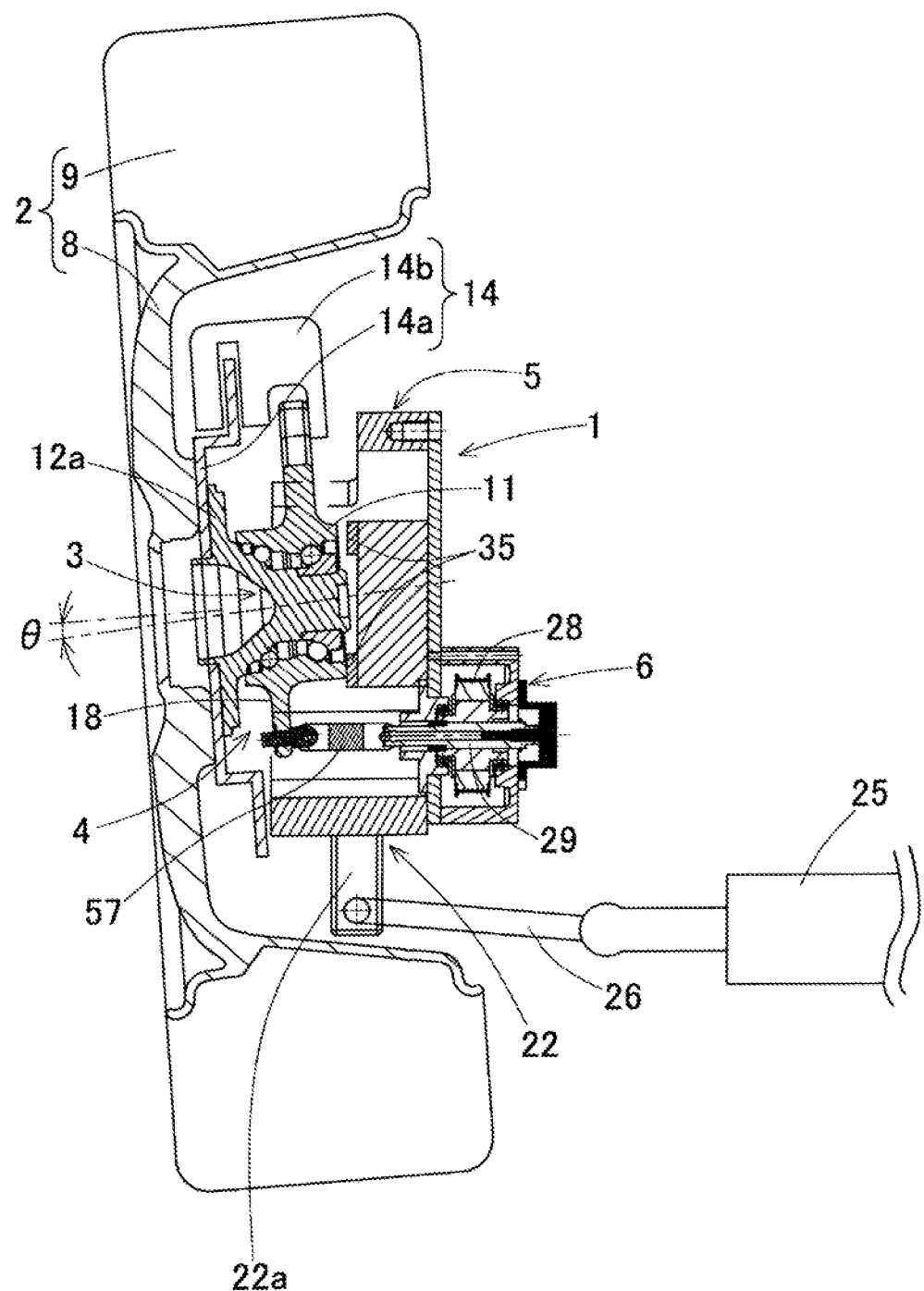
FIG. 7 is a horizontal section view of the supplemental turning function-equipped hub unit in a main-turning non-neutral state.
Figure 8:
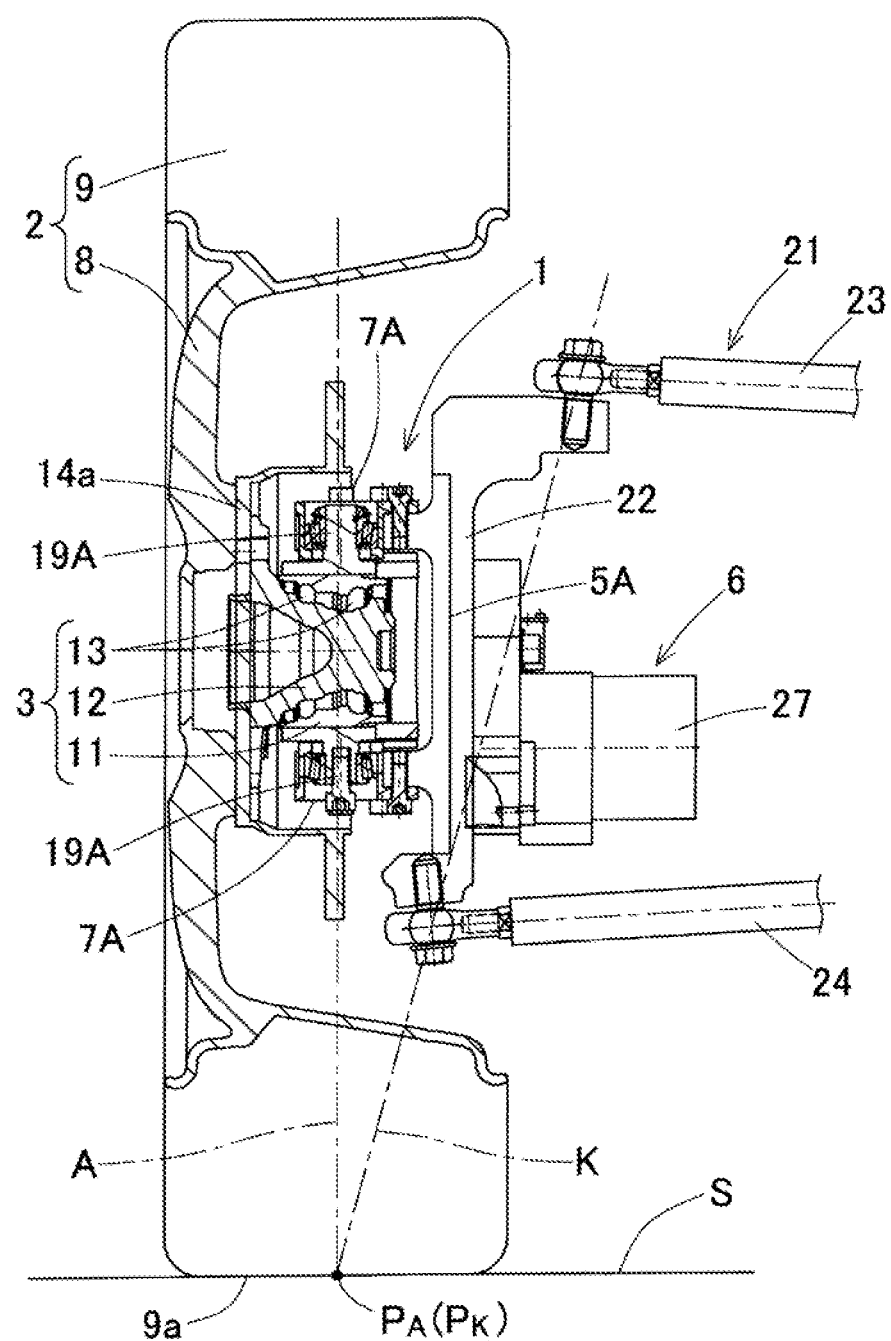
FIG. 8 is a longitudinal section view of a supplemental turning function-equipped hub unit according to a second embodiment of the present invention and surrounding features.
Figure 9:
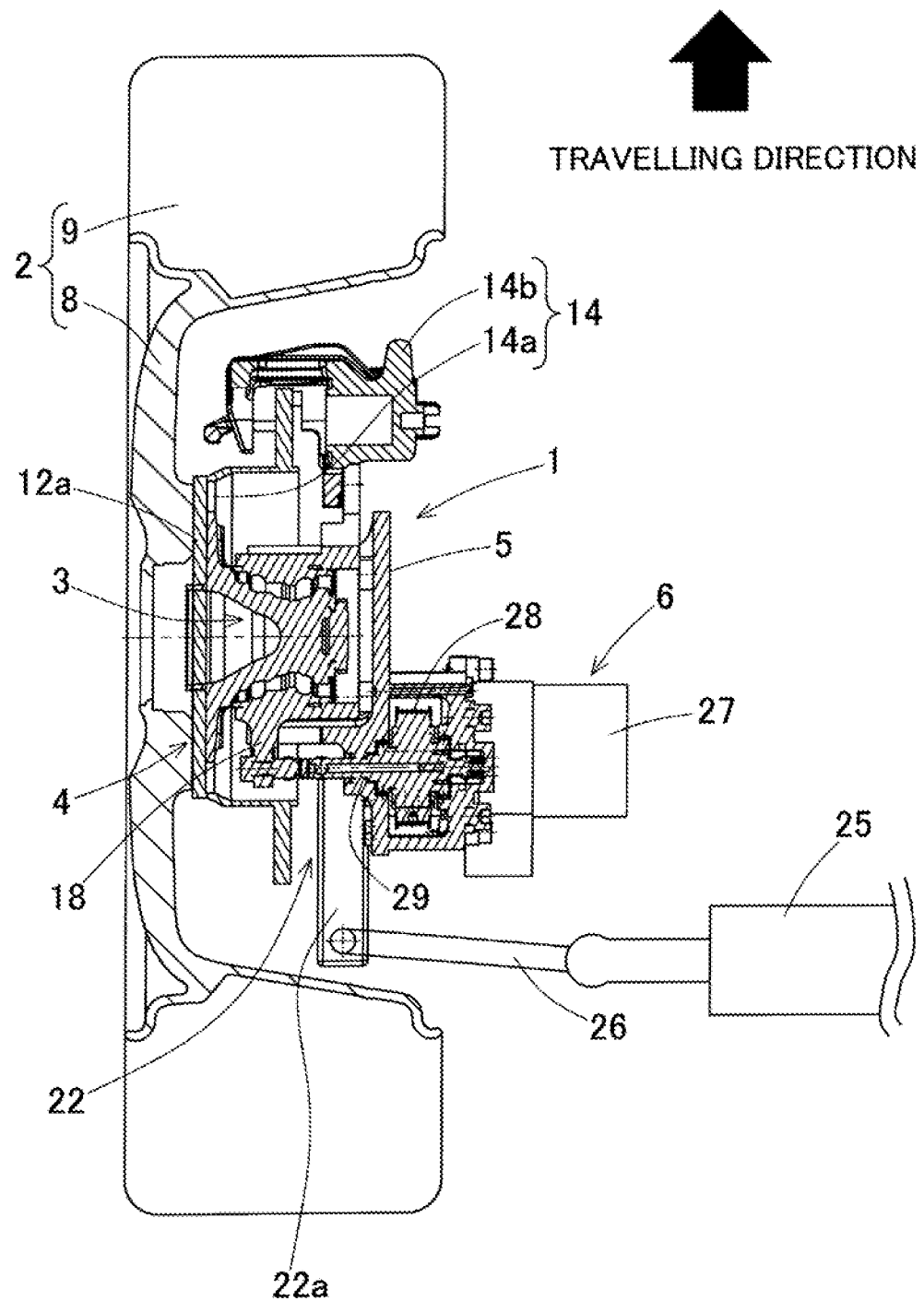
FIG. 9 is a horizontal section view of the supplemental turning function-equipped hub unit and the surrounding features.

An angle θ (FIG. 6, FIG. 7) of supplemental turning with respect to the knuckle 22 of the hub unit body 4 is limited by a stopper 35. FIG. 6 shows a situation where main turning is performed in a straight forward manner and supplemental turning is performed inwardly. FIG. 7 shows a situation where main turning is performed to the left and supplemental turning is performed inwardly. The stopper 35 is provided, for example, on a surface of the unit support member 5, which surface axially confronts the hub unit body 4, or, for example, on a surface of the hub bearing 3, which surface confronts an end face of the outer ring 11. The end face of the outer ring 11 of the hub bearing 3 abuts with the stopper 35, whereby the angle θ of supplemental turning of the hub unit body 4 is limited. An acceptable range of a supplementally turnable angle of the hub unit body 4 may be a small angle range. The acceptable range of the supplementally turnable angle limited by the stopper 35 may be, for example, ±5 degrees or smaller.

In this embodiment, the outer ring 11 of the hub bearing 3 is integrally formed with the attachment seat 19 (FIG. 3, FIG. 4) to which the rotation-permitting support components 7 are attached, the supplemental turning force receiving part 18 (FIG. 2, FIG. 4) and the brake caliper attachment parts 36. It should be noted that as long as the attachment seat 19, the supplemental turning force receiving part 18 and the brake caliper attachment parts 36 are provided on the hub unit body 4, they may be provided in a mounting part (not illustrated), such as an axle box, which may be provided to the outer ring 11.

The above features are described in terms of operation and effects. The supplemental turning function-equipped hub unit 1 is configured such that the hub unit body 4 including the hub bearing 3 and the brake caliper 14b (see FIG. 2) is rotatable about the supplemental turning axis A with respect to the unit support member 5 provided to the knuckle 22 in FIG. 1. That is, a force is applied to the arm-like supplemental turning force receiving part 18 (FIG. 2) that acts as a point of application, whereby the hub unit body 4 can be rotated. The linear output part 6a of the supplemental turning actuator 6 provided to the unit support member 5 advances or retracts by driving the motor 27, whereby the hub unit body 4 is rotated through the supplemental turning force receiving part 18 coupled to the linear output part 6a.

This rotation is performed as supplemental turning in addition to turning performed by steering operation by a driver, i.e., in addition to the rotation of the knuckle 22 about the king pin axis K (FIG. 1) caused by the steering device 25. The supplemental turning is also performed as independent turning of a single wheel. The left and right wheels 2, 2 have different angles of supplemental turning, whereby the toe angle between the left and right wheels 2, 2 can be arbitrarily changed.

Since the tire angles of the left and right wheels can be independently and arbitrarily changed during travelling in accordance with travel conditions of the vehicle 10, motion performance of the vehicle 10 can be improved, making it possible to drive stably. Additionally, a suitable tire angle can be set so as to improve fuel economy. Where the supplemental turning function-equipped hub units 1 are applied to the rear wheels 2R (FIG. 15) that are non-turning wheels, a minimum turning radius when travelling at low speed can be reduced.

The supplemental turning function-equipped hub unit 1 is supported by the rotation-permitting support components 7, 7 at two upper and lower portions thereof so as to be rotatable about the supplemental turning axis A. Thus, this arrangement of the hub unit being supported at both ends thereof ensures rigidity and achieves simple configuration. Accordingly, it is possible to independently perform supplemental turning in the left and right wheels in accordance with travel conditions, with simple configuration, while ensuring rigidity. This makes it possible to arbitrarily change a toe angle of the wheels 2, thereby to change the steering geometries. Therefore, motion performance of the vehicle 10 is improved, making it possible to improve both of travel stability and fuel economy.

An example of the turning-angle difference control of the left and right wheels in accordance with travelling speed will be described. Since a turning device of a general vehicle is mechanically connected to wheels, the vehicle can only assume a single fixed steering geometry and is often arranged or set in an intermediate geometry between Ackermann geometry and parallel geometry. In such a case, the turning angle of the outer ring becomes excessively large in a low-speed range because the difference in turning angles of the left and right wheels is insufficient, whereas the turning angle of the inner ring becomes excessively large in a high-speed range. Thus, when distribution of a tire lateral force becomes unnecessarily unbalanced between inner and outer rings, travel resistance may be deteriorated, causing worsening of fuel economy and early wear of the tire.

Further, smooth cornering is deteriorated because the inner and outer rings cannot not be effectively used.

Since the supplemental turning function-equipped hub unit 1 of this embodiment can individually control the left and right wheels 2, the turning angles or steering angle of the wheels 2 can be changed in accordance with vehicle speed and/or turning acceleration G Specifically, arbitrary selection between Ackermann geometry (in which difference in turning angles of the left and right wheels is set such that the respective wheels rotate about a single common point) in a low-speed range and parallel geometry (in which the turning angles of the left and right wheels are the same) in a high-speed range prevents an increase in travel resistance. Furthermore, this makes it possible to achieve both of smooth turnability at low speed and cornering performance at high speed.

As long as the supplemental turning axis A substantially extends in the vertical direction, it may be tilted to some extent. In this embodiment, the axis A extends in the vertical direction. This makes it possible to better suppress a change in a camber angle due to supplemental turning and to further suppress an increase in travel resistance. Where the king pin axis K and the supplemental turning axis A coincide with each other, supplemental turning of the hub unit body 4 at the king pin axis K causes a large change in the camber angle and increases travel resistance. Separately defining the supplemental turning axis A from the king pin axis K makes it possible to suppress a change in the camber angle due to supplemental turning and to suppress an increase in travel resistance.

Also, where the king pin axis K and the supplemental turning axis A coincide with each other, components are arranged on the vehicle body side in the hub unit body 4, resulting in an increased size and an increased weight as a whole. Defining the supplemental turning axis A in a different direction from that of the king pin axis K of the suspension device 21 makes it possible to reduce the size of the entire device and to reduce the weight.

Further, since both of "the intersection position PK of the extension line of the king pin axis K of the suspension device 21 and the road surface S" and "the intersection position PA of the extension line of the supplemental turning axis A and the road surface S" are located within the tire grounding surface 9a, both of main turning and supplemental turning can be stably and effectively performed.

Where the king pin axis K and the supplemental turning axis A are different from each other, if a point on the both extension lines of the axes is different from a grounding location of the tire 9, slipping may occur when both of them move at the same time. This is inefficient and may disturb vehicle behavior. For this reason, it is desirable that "the intersection position PK of the extension line of the king pin axis K and the road surface S" and "the intersection position PA of the extension line of the supplemental turning axis A and the road surface S" are provided adjacent to each other. The two intersection positions PA, PK preferably coincide with each other. This allows main turning and supplemental turning to be effectively performed without causing slipping, even when main turning and supplemental turning are simultaneously performed, whereby the vehicle can be stably operated.

The angle of supplemental turning can be a small angle in order to improve motion performance of the vehicle and to improve travel stability. Specifically, the supplementally turnable angle may be ±5 degree or smaller. The angle of supplemental turning is adjusted through control performed by the supplemental turning actuator 6. It should be noted that since the angle of supplemental turning is limited by the stopper 35, a large influence is avoided even when a failure occurs in the supplemental turning function-equipped hub unit 1 due to, e.g., a failure of a power supply system. Thus, the vehicle can be pulled over to a safe place by steering operation.

Since the rotation-permitting support component 7 of this embodiment is a spherical sliding bearing, it can rotate in any direction about a spherical center thereof and accommodate inclination of a central axis of the rotation-permitting support component 7, even if the central axis is tilted with respect to the supplemental turning axis A. Therefore, the spherical sliding bearing makes it possible to fix the hub unit body 4 in a different direction from that of the supplemental turning axis A, which improves flexibility in mounting positions and makes it easier to process. Further, use of spherical sliding bearing makes it possible to apply preload between a stationary-side component 16 and a mobile-side component 15 of the bearing through clamping when mounting the bearing, thereby to increase rigidity.

Figure 10:
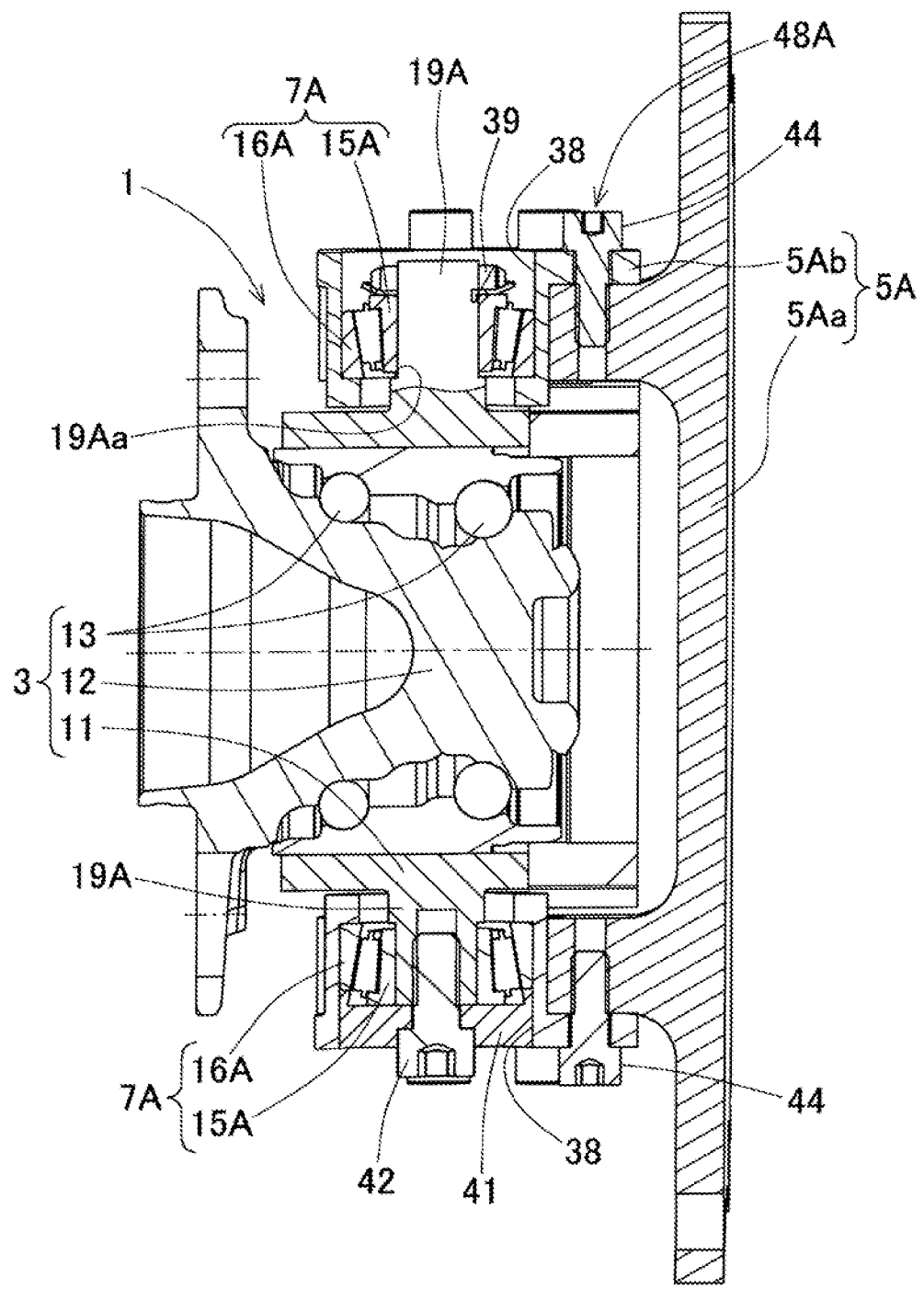
FIG. 10 is a longitudinal section view of the supplemental turning function-equipped hub unit.
Figure 11:
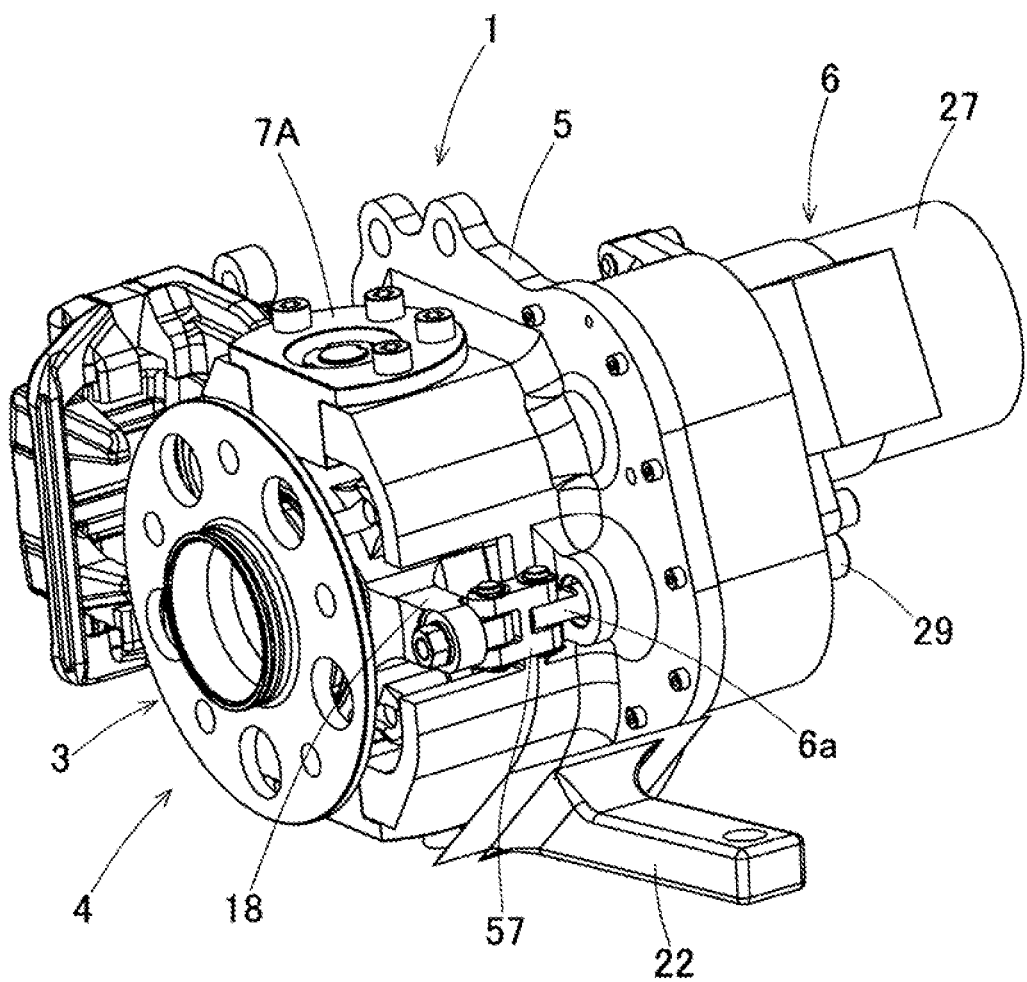
FIG. 11 is a perspective view illustrating an external appearance of the supplemental turning function-equipped hub unit.
Figure 12:
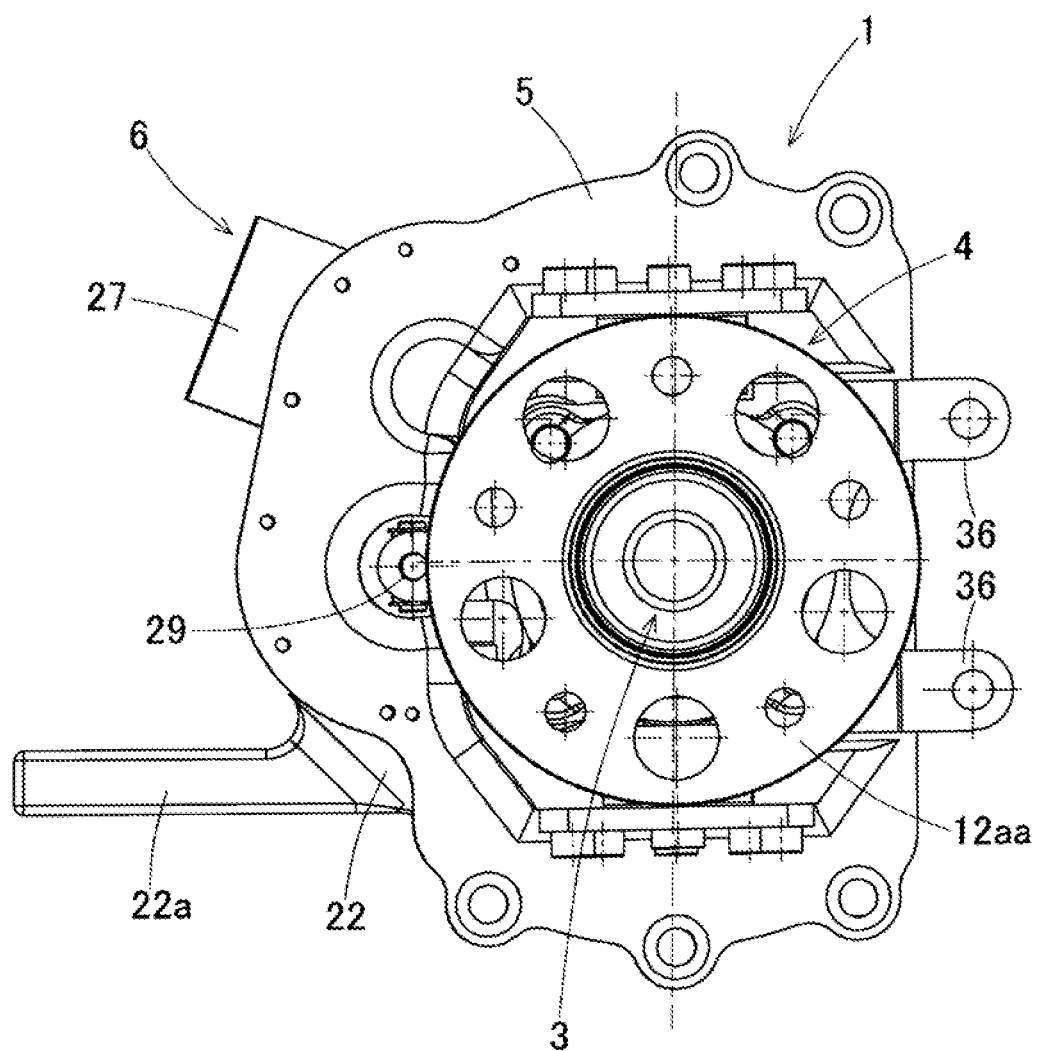
FIG. 12 is a left-side view of the supplemental turning function-equipped hub unit.

FIG. 8 to FIG. 12 show a second embodiment of the present invention. In this embodiment, a rotation-permitting support component 7A in the form of a tapered roller bearing is used, instead of the rotation-permitting support component 7 in the form of the spherical sliding bearing as shown in FIG. 1. As shown in FIG. 10, attachment shaft parts 19A each in the form of a trunnion shaft are provided on the outer ring 11 of the hub bearing 3 so as to protrude. Two of the attachment shaft parts 19A are provided on the upper and lower portions of the outer ring 11. Each of the attachment shaft part 19A in the form of the trunnion shaft has an outer periphery, to which an inner ring 15A of the rotation-permitting support component 7A in the form of the tapered roller bearing is fitted. An outer ring 16A of the rotation-permitting support component 7A is fitted to a fitting hole 38 provided in a unit support member 5A.

The upper rotation-permitting support component 7A is formed with a male thread portion at a tip end (upper end) of the attachment shaft part 19A, and a nut 39 is screwed onto the male thread portion. The nut 39 presses the inner ring 15A in an axial direction (downwardly) of the attachment shaft part 19A. In the lower rotation-permitting support component 7A, a pressing member 41 is fitted to the fitting hole 38 in the unit support member 5A, and a bolt 42 is screwed into a screw hole provided in a hollow part of the attachment shaft part 19A. The bolt 42 presses the end face of the outer ring 16A through the pressing member 41. Pressing by the nut 39 and the bolt 42 applies preload to the upper and lower rotation-permitting support components 7A, respectively, which are in the form of the tapered roller bearings.

The unit support member 5A includes a main member 5Aa and divided bodies 5Ab provided for the respective rotation-permitting support components 7A, 7A, and the main member 5Aa and the divided bodies 5Ab are connected with each other by bolts 44. The unit support member 5A is attached to the knuckle 22 at the divided bodies 5Ab by use of bolts (not illustrated). The main member 5Aa, the divided bodies 5Ab and the bolt 43 cooperate together to constitute a preloading unit 48A.

The upper and lower rotation-permitting support components 7A, 7A may have the same attachment structure to the unit support member 5A. For example, the fixing structure of the upper rotation-permitting support component 7A to the unit support member 5A and the outer ring 11 of the hub bearing 3 as shown in FIG. 10 may be applied to the lower rotation-permitting support component 7A. Alternatively, the fixing structure of the lower rotation-permitting support component 7A may be used to fix the upper rotation-permitting support component 7A.

Thus, even where a rotation-permitting support component 7A in the form of a tapered roller bearing is provided, preload can be applied to the rotation-permitting support component 7A, thereby to enhance rigidity. The rotation-permitting support component 7A may be an angular ball bearing or a four-point-contact ball bearing, instead of a tapered roller bearing. Even in such a case, preload can be applied in the same manner as described above. Since other features and effects of this embodiment are the same as those of the first embodiment, corresponding elements are denoted with like reference numerals, and the description thereof is not repeated.

Figure 13:
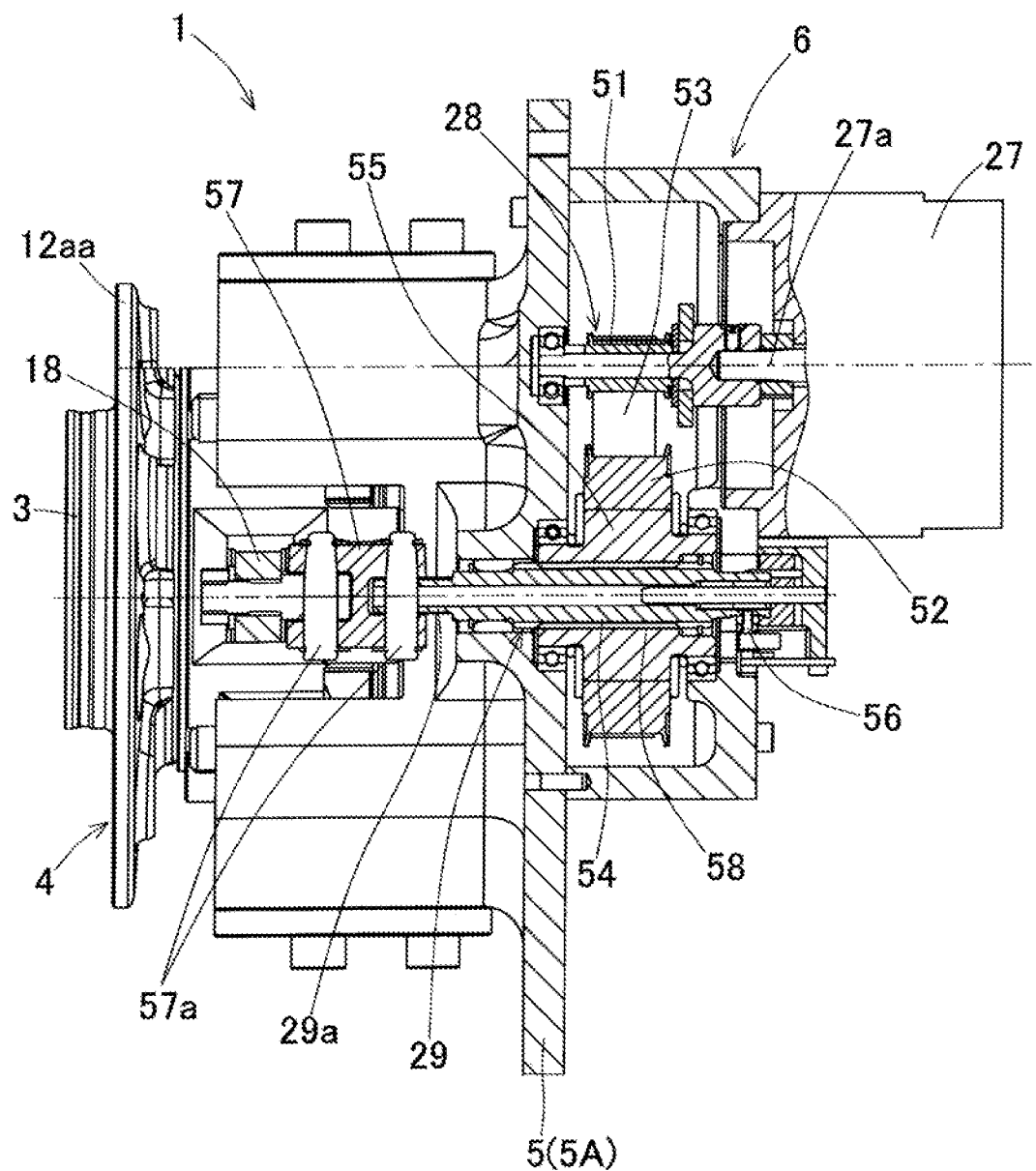
FIG. 13 is a horizontal section view illustrating a specific example of a supplemental turning actuator used in the first and second embodiments.

FIG. 13 shows an example of the supplemental turning actuator 6.

This supplemental turning actuator 6 may be applied either of the first and second embodiments. The driving force of the motor 27 is transmitted to a drive pulley 51 connected to a motor shaft 27a and then to a driven pulley 52 disposed in parallel with the motor shaft 27a through a belt 53. The drive pulley 51, the driven pulley 52 and the belt 53 cooperate together to constitute the winding-type speed reduction gear 28.

The linear mechanism 29 is a feed screw mechanism. A nut 55 is provided on an inner periphery of the driven pulley 52 so as to integrally rotate with the driven pulley. A screw shaft 54 of the linear mechanism 29 is screwed into the nut 55. The nut 55 and the screw shaft 54 are a sliding screw and, specifically, have thread grooves and thread ridges that form thread portions 58 of a trapezoid screw with a self-locking function. Since the rotation of the nut 55 that integrally rotates with the driven pulley 52 prevents the screw shaft 54 from rotating by a locking part 56, the screw shaft 54 linearly moves forward and backward (axially).

The supplemental turning force receiving part 18 provided to the outer ring 11 of the hub bearing 3 is coupled to the linear output part 29a at the tip end of the screw shaft 54 through the joint 57. The joint 57 is rotatably coupled to the supplemental turning force receiving part 18 and the linear output part 29a by two pins 57a. Therefore, thanks to the forward and backward movement of the screw shaft 54, the entirety of the hub unit body 4 including the hub bearing 3 can rotate about the supplemental turning axis A with respect to the unit support member 5 (5A). Although the driven pulley 52 and the nut 55 of the linear mechanism 29 are separately formed in this embodiment, the driven pulley 52 and the nut 55 may be integrally formed.

Thus, where a sliding screw having a self-locking function is used in the linear mechanism 29, reverse input from the tire is prevented. Also, in the event of a failure of the motor 27, the self-locking function prevents the tire 9 from staggering, and the vehicle can be pull over to a safe place by steering operation. Where the linear mechanism 29 has the self-locking function, in the case where supplemental turning is not performed or when travelling at high speed, a fixed angle of supplemental turning can be maintained. This can eliminate the necessity of driving the motor 27 to maintain a fixed angle, thereby to reduce motor power.

Figure 14:
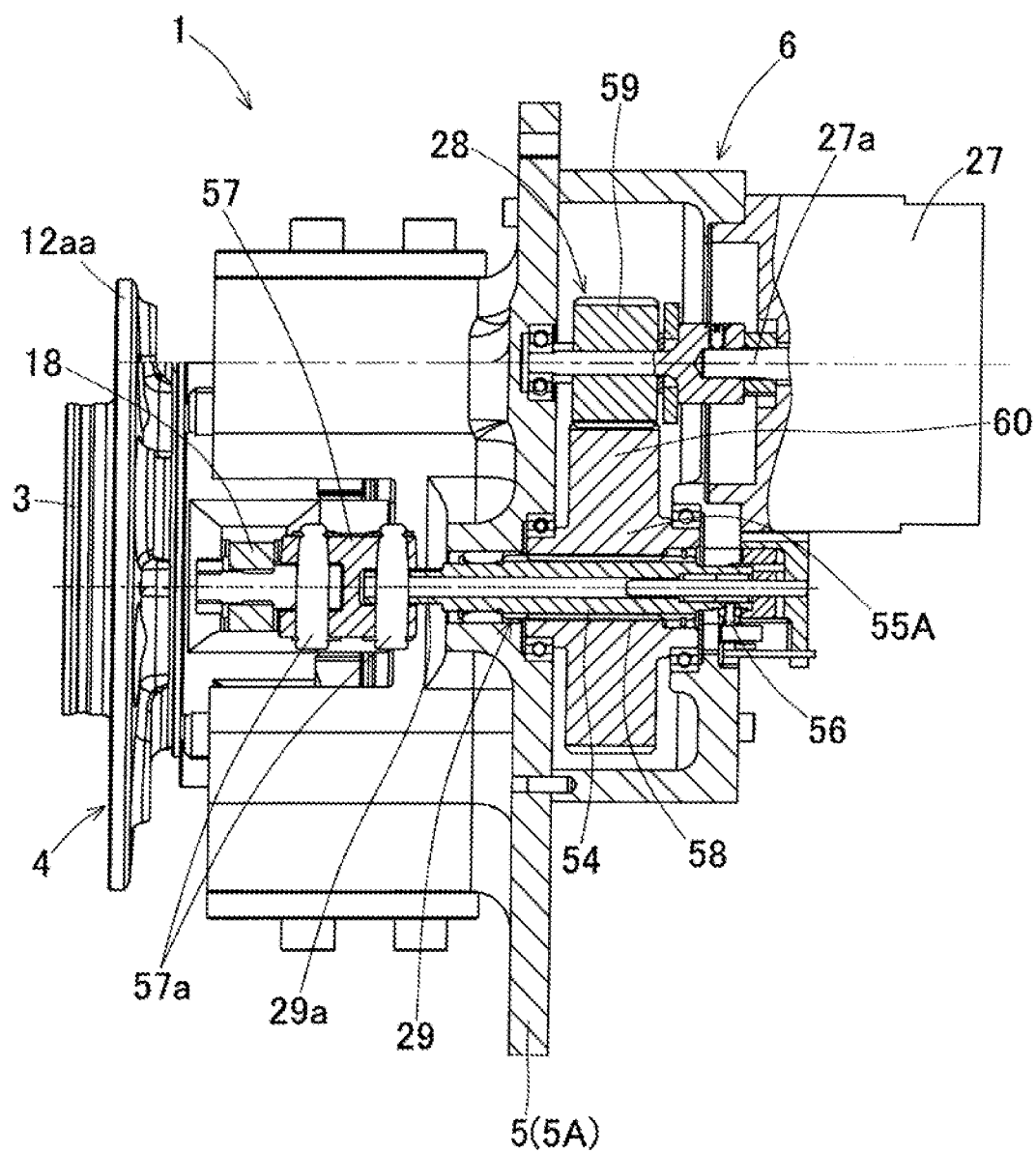
FIG. 14 is a horizontal section view illustrating another specific example of a supplemental turning actuator used in the first and second embodiments.

FIG. 14 shows another example of the supplemental turning actuator 6. The supplemental turning actuator 6 shown in FIG. 14 may also be applied to either of the first and second embodiments. The driving force of the motor 27 is transmitted to a drive gear 59 connected to the motor shaft 27a and then to a driven gear 60 engaged with the drive gear

59. The drive gear 59 and the driven gear 60 cooperate together to constitute a gear train of the speed reduction gear 28.

The linear mechanism 29 is in the form of the feed screw mechanism. The nut 55A is provided at the center of the driven gear 60 so as to integrally rotate with the driven gear 60. The screw shaft 54 of the linear mechanism 29 is screwed into the nut 55A. The configuration of the linear mechanism 29 and the coupling structure between the linear mechanism 29 and the hub unit body 4 are the same as those of the example shown in FIG. 13. That is, the thread portions 58 of the nut 55A and the screw shaft 54 is a sliding screw or specifically, a trapezoid screw having a self-locking function. When the nut 55 that integrally rotates with the driven pulley 52 rotates, the screw shaft 54 linearly moves forward and backward since the screw shaft 54 is prevented from rotating by a locking part 56.

The supplemental turning force receiving part 18 provided to the outer ring 11 of the hub bearing 3 is coupled to the linear output part 29a at the tip end of the screw shaft 54 through the joint 57. The joint 57 is rotatably coupled to the supplemental turning force receiving part 18 and the linear output part 29a by two pins 57a. Therefore, thanks to the forward and backward movement of the screw shaft 54, the entirety of the hub unit body 4 including the hub bearing 3 can rotate about the supplemental turning axis A with respect to the unit support member 5.

Although the driven gear 60 and the nut 55A of the linear mechanism 29 are integrally formed in this embodiment, the driven gear 60 and the nut 55 may be separate members that are connected with each other.

Since the sliding screw having the self-locking function is used in the linear mechanism 29 also in this embodiment, as in the embodiment shown in FIG. 13, the above-described effect of the self-locking function can be obtained. Additionally, in this embodiment, since the speed reduction gear 28 is formed of the gear train, highly-rigid and highly-responsive drive transmission can be performed.

Although the present invention has been described in terms of the preferred embodiments thereof with reference to the drawings, the present invention is not limited to the above embodiments, and various additions, modifications, or deletions may be made without departing from the scope of the invention. Accordingly, such variants are included within the scope of the present invention.

REFERENCE NUMERALS

1 . . . Supplemental turning function-equipped hub unit
2 . . . Wheel
3 . . . Hub bearing
4 . . . Hub unit body
5 . . . Unit support member
5A . . . Unit support member
6 . . . Supplemental turning actuator
6a . . . Linear output part
7 . . . Rotation-permitting support component
7A . . . Rotation-permitting support component
9 . . . Tire
9a . . . Tire grounding surface
10 . . . Vehicle
10A . . . Vehicle body
11 . . . Outer ring
12 . . . Inner ring
13 . . . Rolling element
14a . . . Brake rotor
14b . . . Brake caliper
15 . . . Rotary-side component
16 . . . Stationary-side component
18 . . . Supplemental turning force receiving part
21 . . . Suspension device
22 . . . Knuckle
25 . . . Steering device
26 . . . Tie rod
27 . . . Motor
28 . . . Speed reduction gear
29 . . . Linear mechanism
35 . . . Stopper
36 . . . Brake caliper attachment part
48, 48A . . . Preloading unit
51 . . . Drive pulley
52 . . . Driven pulley
53 . . . Bolt
54 . . . Screw shaft
55 . . . Nut
56 . . . Locking part
57 . . . Joint
57a . . . Pin
58 . . . Thread portion
59 . . . Drive gear
60 . . . Driven gear
A . . . Supplemental turning axis
K . . . King pin axis
O . . . Rotation axis
PK . . . Intersection position
PA . . . Intersection position
S . . . Road surface
θ . . . Angle of supplemental turning

What is claimed is:

1. A supplemental turning function-equipped hub unit comprising:
    a hub unit body including a hub bearing configured to support a wheel;
    a unit support member configured to be mounted to a vehicle body through a suspension device and to be rotatably coupled with a tie rod of a steering device, the unit support member supporting the hub unit body through rotation-permitting support components at two portions of upper and lower portions of the hub unit body such that the hub unit body is rotatable about a supplemental turning axis extending in a vertical direction;
    a supplemental turning force receiving part protruding from a side part of the hub unit body, the supplemental turning force receiving part being configured to receive a force that causes the hub unit body to rotate about the supplemental turning axis; and
    a supplemental turning actuator, supported by the unit support member, configured to apply a driving force via a linear mechanism to cause a force to be applied to the supplemental turning force receiving part in a direction parallel to an axis of rotation of the wheel, to thereby cause the hub unit body to rotate about the supplemental turning axis with respect to the unit support member.

2. The supplemental turning function-equipped hub unit as claimed in claim 1, wherein at least a portion of the supplemental turning actuator is mounted to a first side of the unit support member which is opposite to a second side of the unit support member facing the hub unit body.

3. The supplemental turning function-equipped hub unit as claimed in claim 1, wherein the linear mechanism passes through a portion of the unit support member, and includes one end portion to receive the driving force and another end portion coupled to the supplemental turning force receiving part via a joint to apply the force to the supplemental turning force receiving part in the direction parallel to the axis of rotation of the wheel.

4. The supplemental turning function-equipped hub unit as claimed in claim 1, wherein each of the rotation-permitting support components includes a spherical sliding bearing.

5. The supplemental turning function-equipped hub unit as claimed in claim 1, wherein each of the rotation-permitting support components is a tapered roller bearing, or an angular ball bearing, or a four-point-contact ball bearing.

6. A vehicle comprising the supplemental turning function-equipped hub unit as claimed in claim 1,
wherein one or both of front wheels and rear wheels are supported by the supplemental turning function-equipped hub unit.

7. The supplemental turning function-equipped hub unit as claimed in claim 1, wherein the supplemental turning force receiving part protrudes in a direction perpendicular to the supplemental turning axis.

8. The supplemental turning function-equipped hub unit as claimed in claim 1, wherein the supplemental turning axis extends in the vertical direction and passes through a portion of the wheel.

\* \* \* \* \*